United States Patent
Meijer

(10) Patent No.: US 9,952,893 B2
(45) Date of Patent: Apr. 24, 2018

(54) SPREADSHEET MODEL FOR DISTRIBUTED COMPUTATIONS

(75) Inventor: Henricus Johannes Maria Meijer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 534 days.

(21) Appl. No.: 12/939,139

(22) Filed: Nov. 3, 2010

(65) Prior Publication Data
US 2012/0110428 A1    May 3, 2012

(51) Int. Cl.
*G06F 17/00* (2006.01)
*G06F 9/46* (2006.01)

(52) U.S. Cl.
CPC ............................. *G06F 9/46* (2013.01)

(58) Field of Classification Search
CPC ......... G06F 17/30575; G06F 17/30979; G06F 17/30513; G06F 17/30445
USPC .......... 715/212, 219; 707/610–615, 628–632
See application file for complete search history.

(56) References Cited

U.S. PATENT DOCUMENTS

| | | | |
|---|---|---|---|
| 5,920,697 A * | 7/1999 | Masters et al. | 709/219 |
| 6,226,694 B1 * | 5/2001 | Constant | G06F 8/458 |
| | | | 711/141 |
| 6,631,497 B1 * | 10/2003 | Jamshidi et al. | 715/205 |
| 7,047,484 B1 * | 5/2006 | Becker et al. | 715/201 |
| 7,200,720 B1 * | 4/2007 | Yang | G06F 17/30348 |
| | | | 707/999.2 |
| 7,225,189 B1 * | 5/2007 | McCormack et al. | |
| 7,761,782 B1 * | 7/2010 | Warren et al. | 715/212 |
| 2001/0047372 A1 * | 11/2001 | Gorelik | G06F 17/30604 |
| | | | 715/239 |
| 2002/0184247 A1 * | 12/2002 | Jokela et al. | 707/204 |
| 2003/0204570 A1 * | 10/2003 | Rehof | G06F 9/546 |
| | | | 709/207 |
| 2004/0044753 A1 * | 3/2004 | Toyoshima et al. | 709/223 |
| 2005/0036518 A1 * | 2/2005 | Link | H04J 3/04 |
| | | | 370/503 |
| 2005/0182776 A1 * | 8/2005 | Yennie | 707/100 |
| 2005/0183071 A1 * | 8/2005 | Meijer | G06F 9/4425 |
| | | | 717/140 |
| 2006/0095447 A1 * | 5/2006 | Dickinson et al. | 707/100 |
| 2006/0122977 A1 * | 6/2006 | Brodhun et al. | 707/3 |
| 2006/0174170 A1 * | 8/2006 | Garland et al. | 714/57 |

(Continued)

FOREIGN PATENT DOCUMENTS

| | | |
|---|---|---|
| CN | 1211746 C | 7/2005 |
| CN | 1758247 A | 4/2006 |

(Continued)

OTHER PUBLICATIONS

Marc Seeger, Key-Value Stores: a practical overview, Sep. 21, 2009, Medien Informatik, pp. 1, 4, 15.*

(Continued)

*Primary Examiner* — Howard Cortes

(57) ABSTRACT

A spreadsheet model is employed to facilitate distributed computations. Spreadsheets and cells are generalized to correspond to arbitrary data sources that can be remote from each other, among other things. Functions can be specified with respect to these arbitrary data sources to produce combinations of data or mashups, for example, wherein changes initiate re-computation with respect to dependent data sources.

19 Claims, 10 Drawing Sheets

(56) References Cited

U.S. PATENT DOCUMENTS

| | | | | |
|---|---|---|---|---|
| 2006/0212791 | A1* | 9/2006 | Crow et al. | 715/503 |
| 2006/0294494 | A1* | 12/2006 | Quinn et al. | 717/104 |
| 2007/0033519 | A1* | 2/2007 | Zdenek | 715/503 |
| 2007/0038666 | A1* | 2/2007 | Meijer | G06F 17/30557 |
| 2007/0149184 | A1* | 6/2007 | Viegers | G06Q 10/06 |
| | | | | 455/422.1 |
| 2008/0005183 | A1* | 1/2008 | Bostick et al. | 707/200 |
| 2008/0086716 | A1* | 4/2008 | Devore et al. | 717/102 |
| 2008/0177716 | A1* | 7/2008 | Hejlsberg | G06F 17/3048 |
| 2008/0222570 | A1* | 9/2008 | MacLaurin et al. | 715/839 |
| 2009/0049421 | A1* | 2/2009 | Meijer et al. | 717/100 |
| 2010/0095197 | A1* | 4/2010 | Klevenz | G06F 17/2247 |
| | | | | 715/234 |

FOREIGN PATENT DOCUMENTS

| | | |
|---|---|---|
| CN | 1794640 A | 6/2006 |
| CN | 101438276 A | 5/2009 |
| CN | 101694665 A | 4/2010 |

OTHER PUBLICATIONS

Erlang, Event Service, 1997, Ericsson Telecom AB, pp. 1-5 Retrieved:http://www1.erlang.org/documentation/doc4.7.3/lib/orber2.0/doc/html/ch_event_service.html.*

Kanaka Juvva et al, A Real-Time Push-Pull Communications Model for Distributed Real-Time and Multimedia Systems, Jan. 1999, School of Computer Science, Carnegie Mellon University pp. 1-25.*

Jafar Husain, Introducing RX(Linq to Events), Jul. 22, 2009, pp. 1-21 Retrieved:http://themechanicalbride.blogspot.com/2009/07/introducingrxlinqtoevents.html.*

Paul Batum, Reacting to the Reactive Framework: Parts 1-7, Sep. 11, 2009, pp. 2-22, Retrieved: http://www.paulbatum.com/search/label/Reactive%20Framework.*

Matthew Podwysocki, Introducing the Reactive Framework Part 1, Oct. 14, 2009, CodeBetter.com, pp. 1-5 Retrieved:http://codebetter.com/matthewpodwysocki/2009/10/14/introducingthereactiveframeworkparti/.*

Charles, E2E: Erik Meijer and Wes Dyer—Reactive Framework (Rx) Under the Hood 1 of 2 Sep. 28, 2009, pp. 1-9 Retrieved:https://channel9.msdn.com/shows/Going+Deep/E2EErik-MeijerandWesDyerReactiveFrameworkRxUndertheHood1of2/1/.*

Charles, E2E: Erik Meijer and Wes Dyer—Reactive Framework (Rx) Under the Hood 2 of 2, Sep. 28, 2009, pp. 1-18 Retrieved: https://channel9.msdn.com/Shows/Going+Deep/E2EErikMeijerandWesDyerReactiveFrameworkRxUndertheHood2of2?ocid=EntriesInArea.*

Shelley Higgins et al, Oracle XML DB, Dec. 2003, Oracle, pp. 1-14, 1-15.*

Anith P. Sheth, Using Polytransactions to Manage Interdependent Data, 1992, pp. 1-27.*

"First Office Action and Search Report Issued in Chinese Patent Application No. 201110364417.2", dated Dec. 30, 2013, 13 Pages.

"Second Office Action Issued in Chinese Patent Application No. 201110364417.2", dated Jun. 16, 2014, 10 Pages.

"Third Office Action Issued in Chinese Patent Application No. 201110364417.2", dated Dec. 25, 2014, 11 Pages.

"Fourth Office Action Issued in Chinese Patent Application No. 201110364417.2", dated Jul. 13, 2015, 9 Pages.

"Office Action Issued in Chinese Patent Application No. 201110364417.2", dated Feb. 2, 2016, 9 Pages.

"Office Action Issued in Chinese Patent Application No. 201110364417.2" dated Mar. 9, 2017, 11 Pages.

* cited by examiner

SPREADSHEET MODEL FOR DISTRIBUTED COMPUTATIONS

BACKGROUND

A data model describes how data can be stored and accessed. More formally, data models define data entities and relationships between the data entities. The primary objective of a data model is to provide a definition and format of data to facilitate management and processing of large quantities of data. One application of data models is database models, which define how a database or other store is structured and utilized. A database model can be relational or non-relational.

In a relational model, or more particularly a relational database, data is structured in terms of one or more tables. Tables are relations that comprise a number of columns and rows, wherein the named columns are referred to as attributes and rows capture data for specific entity instances. For example, a table can capture information about a particular entity such as a book in rows, also called tuples, and columns. The columns identify various attributes of an entity such as the title, author, and year of publication of a book. The rows capture an instance of an entity such as a particular book. In other words, each row in the table represents attributes of a particular book. Further yet, a table can include primary and foreign keys that enable two or more tables to be linked together.

Amongst many implementations of a non-relational model, a key-value model is one of the most popular. Key-value databases or stores represent a simple data model that maps unique keys to a set of one or more values. More specifically, the key-value store stores values and an index to facilitate location of the stored values based on a key. For example, a key can be located that identifies one of a title, author, or publication of a data of a book.

Relational databases are often referred to as SQL databases while some non-relational databases are called NoSQL databases or stores. SQL stands for Structured Query Language, which is the primary language utilized to query and otherwise interact with data in a relational database. When SQL is utilized in conjunction with a relational database, the database can be referred to as a SQL-based relational database. However, more often a SQL-based relational database is simply referred to as a SQL database and used as a synonym for a relational database. NoSQL is a term utilized to designate databases that differ from SQL-based relational databases. In other words, the term NoSQL is used as a synonym for a non-relational database or store such as but not limited to a key-value store.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to a spreadsheet model for distributed computations. More particularly, the spreadsheet paradigm is generalized by replacing cells with arbitrary data sources (e.g., SQL, NoSQL, push-based interaction, pull-based interaction . . . ) that can also be distributed, or remote from each other. Additionally, functions can be specified with respect to such arbitrary data sources to produce combined data or mashups, and changes can initiation re-computation with respect to dependent data sources.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward a spreadsheet model for distributed computation. Building distributed applications that use asynchrony and eventual consistency is a difficult and unnatural act for most program developers since all sorts of low-level details and mechanisms need to be understood to combine data sources. However, most developers are already very familiar with a computational paradigm for asynchronous and eventually consistent computations, namely spreadsheets. In spreadsheets, cells can change asynchronously by way of user input, which can trigger re-computation of functions that in turn can cause other cells to change. Nevertheless, the spreadsheet will eventually converge to a steady state.

As described herein, the spreadsheet paradigm is generalized and applied to arbitrary as well as distributed data sources including relational (e.g., SQL) and non-relational (e.g., NoSQL, coSQL) as well as push- and pull-based data interaction. Functions can be specified with respect to the arbitrary data sources to produce combinations of data or mashups, for example, with globally asynchronous and eventually consistent computations. Consequently, the spreadsheet model for distributed computation substantially reduces the burden associated with development of distributed applications including asynchrony and eventual consistency, among other things.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
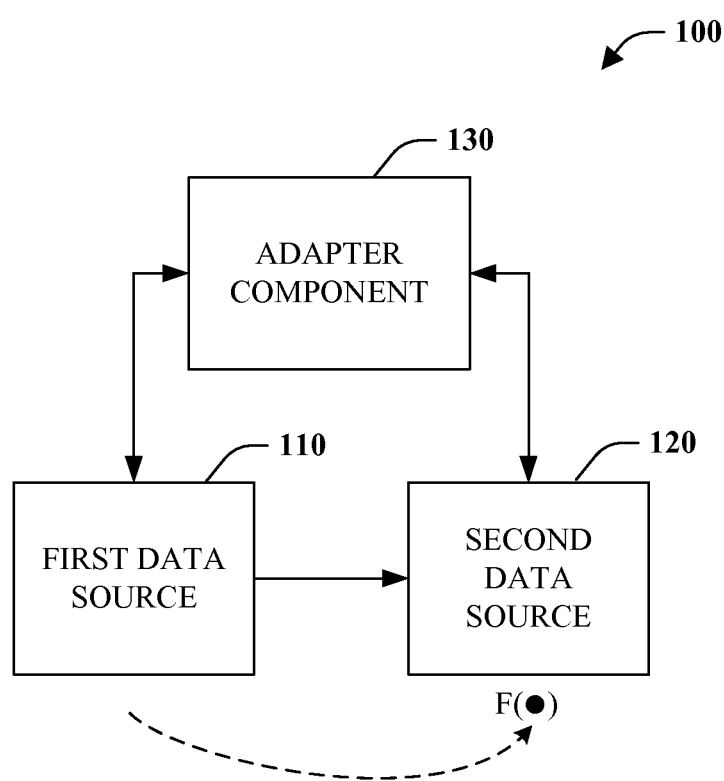
FIG. 1 is a block diagram of system that facilitates distributed computation.

Referring initially to FIG. 1, a distributed computation system 100 is illustrated. The system 100 includes a first data source 110 and a second data source 120, as well as an adapter component 130. The first data source 110 and the second data source can be functionally coupled, distributed data sources, or, in other words, streams. In this manner, the first data source 110 and the second data source 120 can form a simple mashup, wherein data is combined across data sources to produce new data. Here, the second data source 120 is functionally dependent upon the first data source 110 as indicated by the arrow from the first data source 110 to the second data source 120. In other words, one or more values or elements of the second data source 120 can be generated as a function of data from the first data source 110. For example, if the function is simple addition of one (e.g., $f(x)=x+1$), the value housed in the second data source 120 will be the value of the first data source 110 incremented by one. Moreover, the value of the first data source 110 can change asynchronously, and as a result, the value of the second data source 120 can be re-computed to reflect this change.

Figure 2:
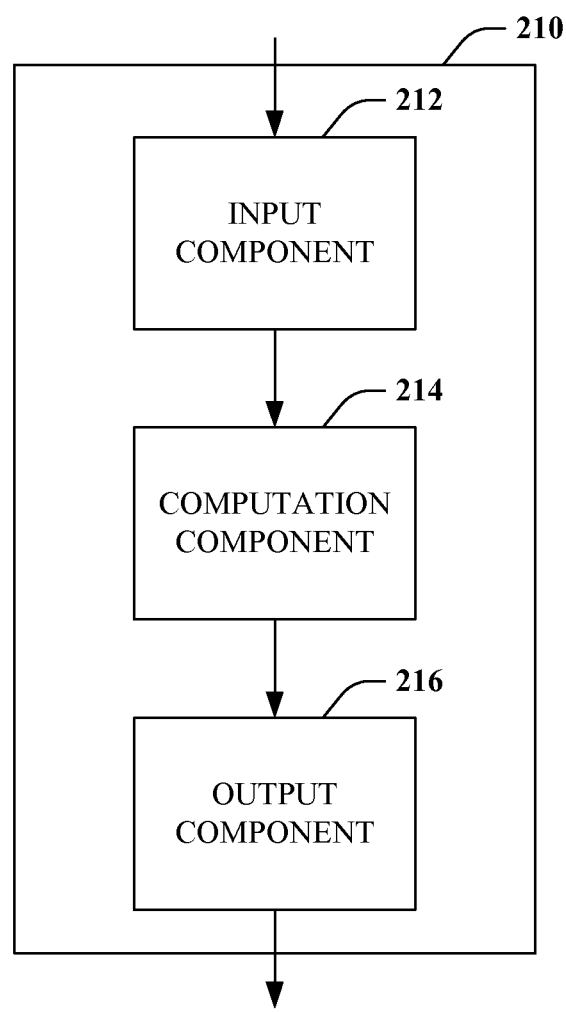
FIG. 2 is a block diagram of a representative data source.

Referring briefly to FIG. 2 exemplary data source 210 is illustrated in further detail includes an input component 212, a computation component 214, and an output component 216. The input component 212 is capable of receiving, retrieving, or otherwise obtaining or acquiring data, including data provided by an adapter as will be discussed later herein. The computation component 214 can compute some result or produce new data (e.g., single value, stream of values . . . ) as a function of at least the input data. The output component 216 is configured to provide (e.g., push) or otherwise make available (e.g., pull) data including the input data or, where a computation is involved, the result of the computation. Of course, the value of the exemplary data source 210 need not be computed at all and if it is a computed value such computation need not take place within the within the data source 210 itself Stated differently, the exemplary data source 210 can operate in a matter analogous to a spreadsheet cell including accepting input, computing a value based on an associated function, and optionally acting as input to one or more other cells. Here, however, the exemplary data source 210 need not be confined to numbers and local computation, as is the case with spreadsheet cells.

Returning to FIG. 1, the first data source 110 and the second data source 120 can be arbitrary data sources. In other words, the sources can support various data models (e.g., relational, non-relational . . . ) and classifications of data based on how the data is acquired (e.g., push-based, pull-based). Thus, the distributed computation system 100 generalizes a conventional spreadsheet model wherein cells can be arbitrary data sources. Furthermore, interactions can take place between arbitrary data models. For example, the first data source 110 can be implemented on a relational database while the second-data source can be implemented on a non-relational database (e.g., key-value store, NoSQL, SQL). The adapter component 130 is configured to facilitate provisioning of data between first data source 110 and second data source 120 where the sources interact with data differently.

Figure 3A:
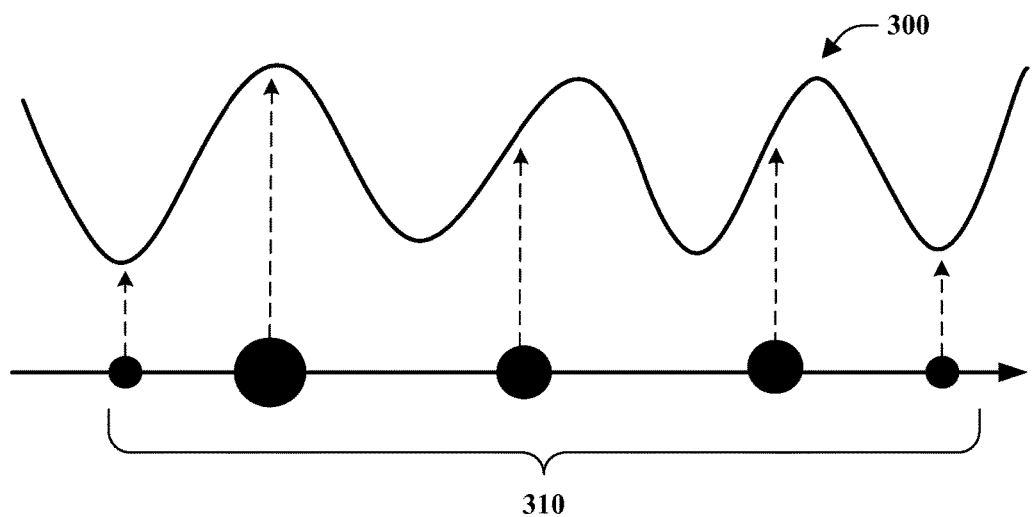
FIG. 3A illustrates an example of push-based data.
Figure 3B:
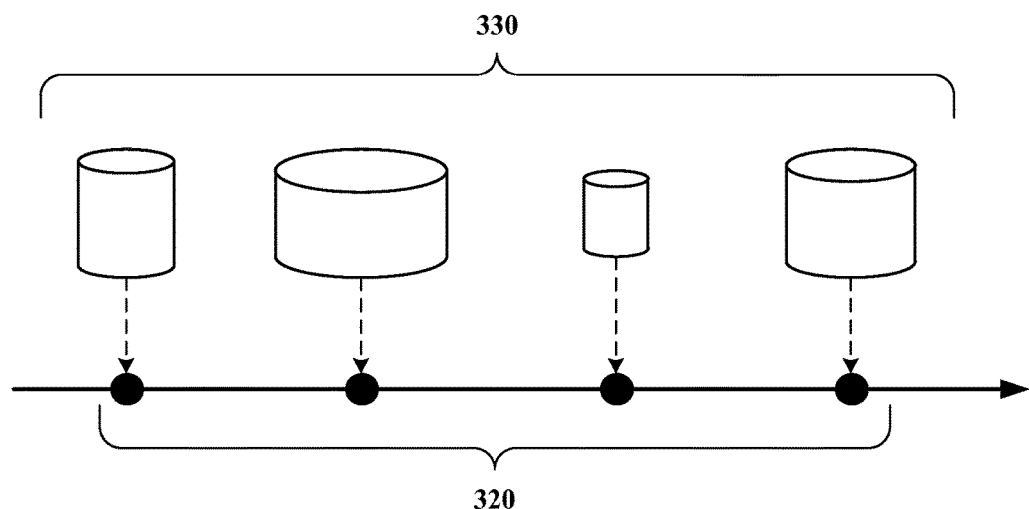
FIG. 3B depicts an example of pull-based data.

FIGS. 3A and 3B graphically depicted two classifications of data, namely pull-based data and push-based data, respectively, to aid clarity and understanding with respect to an aspect of the subject disclosure. FIG. 3A illustrates a continuous stream of data 300 that changes over time. For example, the continuous stream of data 200 can represent temperature or a tide level. To acquire data, the continuous stream of data 200 can be sampled at some frequency, or, in other words, data can be pulled from the continuous stream of data 300 at different times. This pulled data 210 is represented as circles of various sizes, wherein the size of the circle is indicative of the value of the data at a particular point in time (flowing from left to right). FIG. 3B depicts a series of asynchronous events 220 that are pushed, streamed, or otherwise provided from one or more sources 230. For example, stock price information or operating system alerts can be provided in this manner. Of course, some data sources may be configured to handle either push-based or pull-based data interactions but not both. Accordingly, issues can result with respect to combining data sources.

Figure 4A:
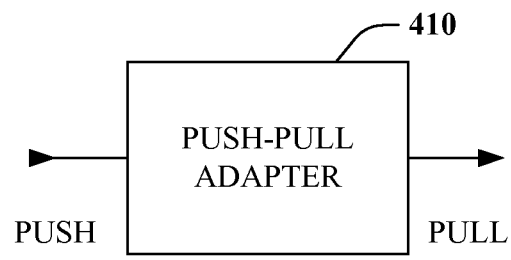
FIG. 4A is a block diagram of a representative push-pull adapter.
Figure 4B:
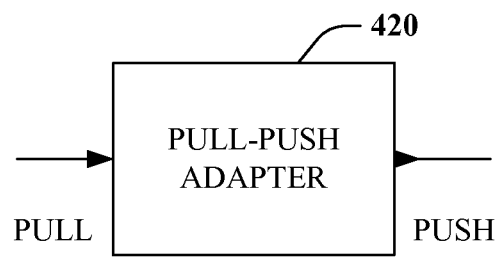
FIG. 4B is a block diagram of a representative pull-push adapter.

The adapter component 130 of FIG. 1 can be utilized to convert between push- and pull-based data sources. More specifically, the adapter component 130 can be embodied as a push-pull adapter 410 of FIG. 4A or a pull-push adapter 420 of FIG. 4B. As the name suggests, the push-pull adapter 410 can acquire or otherwise receive push data and enable the data to be actively retrieved by way of a pull mechanism. In particular, the push-pull adapter allows data to be queued up and later pulled out of the queue, incrementally, for example upon a "GetNext" or like instruction. For instance, a stream of SMS (Short Message Service) messages can be subscribed to and the results can be buffered until an entity requests the next value. By contrast, the pull-push adapter 420 can pull, or, in other words actively retrieve, data from a source periodically (e.g., every ten minutes) and push, or stated differently send, it to another source. For example, an RSS (Really Simple Syndication) feed can be sampled periodically and when a change is detected, the result can be published to a push-based stream.

Figure 5:
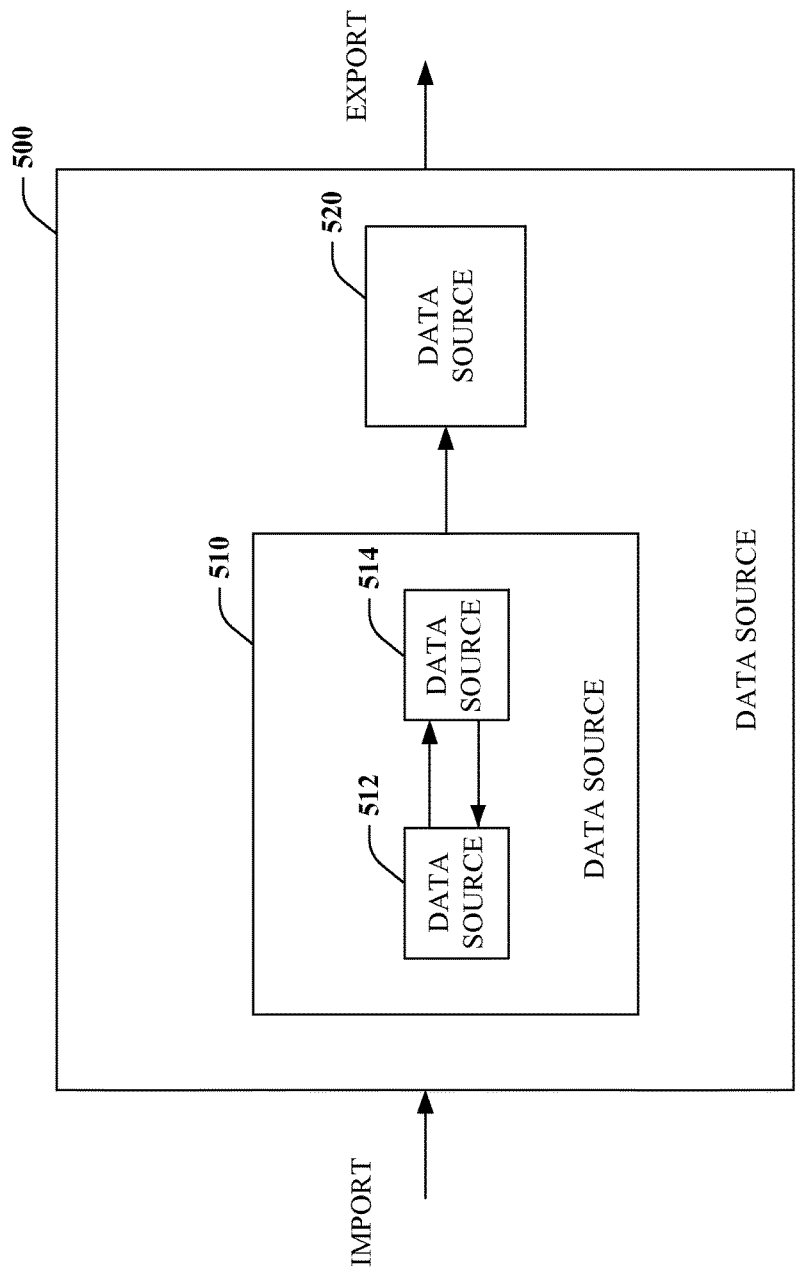
FIG. 5 is a block diagram of illustrating data source composition.

Unlike conventional spreadsheets, in accordance with one embodiment of the disclosed subject matter, data sources can be fully compositional. To aid clarity and understanding with respect to this aspect, an exemplary data source 500 is illustrated in FIG. 5, which is composed of a plurality of other data sources 510, 512, 514, and 520. As shown, data source 500 is composed of two embedded or nested data sources 510 and 520. In a spreadsheet context, this can correspond to encapsulating spreadsheets as other spreadsheets. Data source 510 and 520 are linked together such that data source 520 can receive input from data source 510 similar to linking of one spreadsheet to another. Further, data source 510 is composed of data source 512 and data source 514 which are also linked together. Here, however, the links go both ways indicating that data source 514 employs data provided by data source 512 and data source 512 employs data provided by data source 514. In other words, a cycle exists. Furthermore, where a particular data source is not of an appropriate form, it can be imported, or adapted and feed, into this spreadsheet-based data source world. Similarly, data from data sources can be exported to an alternate form to facilitate utilization outside this world.

At a global level, a combination of data sources such as those provided with respect to FIG. 5, can be asynchronous (e.g. independent of program control flow) and eventually consistent. This is a generalization of the spreadsheet model that is asynchronously changing (e.g., cell modification by user, dependent cell updating) but the spreadsheet as a whole is eventually consistent after a change is propagated. For example, a user might change the value of a cell corresponding to a price of a component part of a product, which could then be propagated to change a cell that represents, by way of an associated function, the total cost of a product by adding the costs of all component parts. Additionally, if a cycle exists, a data source or set of data sources can be made artificially consistent by confining the number of cycles to some limited number (e.g., 100 cycles). Further, an explicit re-compute instruction could be used to force updating and movement to a new consistent state.

At a local level, computations can be synchronous and transactional. To facilitate clarity and understanding, consider a scenario in which a data source "C" is computed as the sum of data sources "A" and "B," and initially data source "A" has the value "2" and data source "B" has the value "1" and thus data source "C" has the computed value "3." When data source "A" changes from "2" to "3," data source "C" is re-computed to be "4." However, data source "B" can change, for example from "1" to "4," prior to completion of the first computation corresponding to the change with respect to data source "A." In this case, the changes can be performed synchronously or in other words in the order in which they occurred. Furthermore, changes are performed as transactions and thus maintain ACID properties of "Atomicity," "Consistency," "Isolation," and Durability. Stated differently, modifications are completely effected or not effected at all, the transaction takes the data source from one consistent state to another, other operations cannot access data that has been modified by a transaction until the transaction has completed, and committed transactions are recoverable in the presence of system failure. Thus, the effect of the change in data source "A" is first propagated and then the effect of the change in data source "B" is propagated. In other words, data source "C" is initially "3," is changed to "4" when data source "A" changes from "2" to "3," and then is changed to "7" when data source "B" changes from "1" to "4."

Returning to the global level again briefly, note that utilizing an asynchronous and eventually consistent model as discussed has the benefit of returning asynchronously, but a read operation can return an old, or stale, value. If this is an issue, as an alternative, a blocking write could be utilized where the write only succeeds if the write has been propagated throughout the network of data sources such that a subsequent read will return the latest, or current, value.

As part of the generalization of the spreadsheet model, cells can be lifted to, or thought of at a higher-level of abstraction as, streams of data rather than a particular numeric value. Furthermore, these steams of data can be observable. In other words, rather than a cell being of type "Integer," it can be of type "IObservable<Integer>," as defined by programming languages such as C#® and Visual Basic®, for example, such that whenever a change occurs with respect to one stream, dependent streams are automatically re-computed based on the change (e.g., "IO<int>=IO<int>+IO<int>"). Further yet, to the extent a language integrated query (LINQ) system or infrastructure supports use of observable or like types or interfaces, language-integrated queries can be utilized to specify functions that, in at least in some sense, glue data sources together.

A LINQ system can enable programmers to specify a language-integrated query or query expression utilizing convenient and declarative shorthand query syntax (e.g., SQL-like) to facilitate specification of queries within a programming language (e.g., C#®, Visual Basic® . . . ). More specifically, query operators are provided that map to lower-level language constructs or primitives such as methods and lambda expressions that can be injected into a program by a compiler, for example. Query operators are provided for various families of operations (e.g., filtering, projection, joining, grouping, ordering . . . ), and can include but are not limited to "where" and "select" operators that map to methods that implement the operators that these names represent. By way of example, a user can specify a query in a form such as "from n in numbers where n<10 select n," wherein "numbers" is a data source and the query returns integers from the data source that are less than ten. Further, query operators can be combined in various ways to generate queries of arbitrary complexity. Still further yet, the LINQ system can enable such queries can be specified and subsequently facilitate execution over arbitrary data sources such as but not limited to relational stores such as a SQL database and non-relational stores such as a NoSQL database (e.g., key-value store) or coSQL (e.g., the mathematical dual of the SQL relational database model). Consequently, generating applications that combine different kinds of data sources, or in other words, produce mashups, is quite easy, since programmers need not understand all sorts of low-level details and mechanisms.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, functions specified with respect to data stores and the computation component 214 can employ such mechanisms.

In view of the exemplary systems described supra, methodologies that may be implemented in accordance with the disclosed subject matter will be better appreciated with reference to the flow charts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
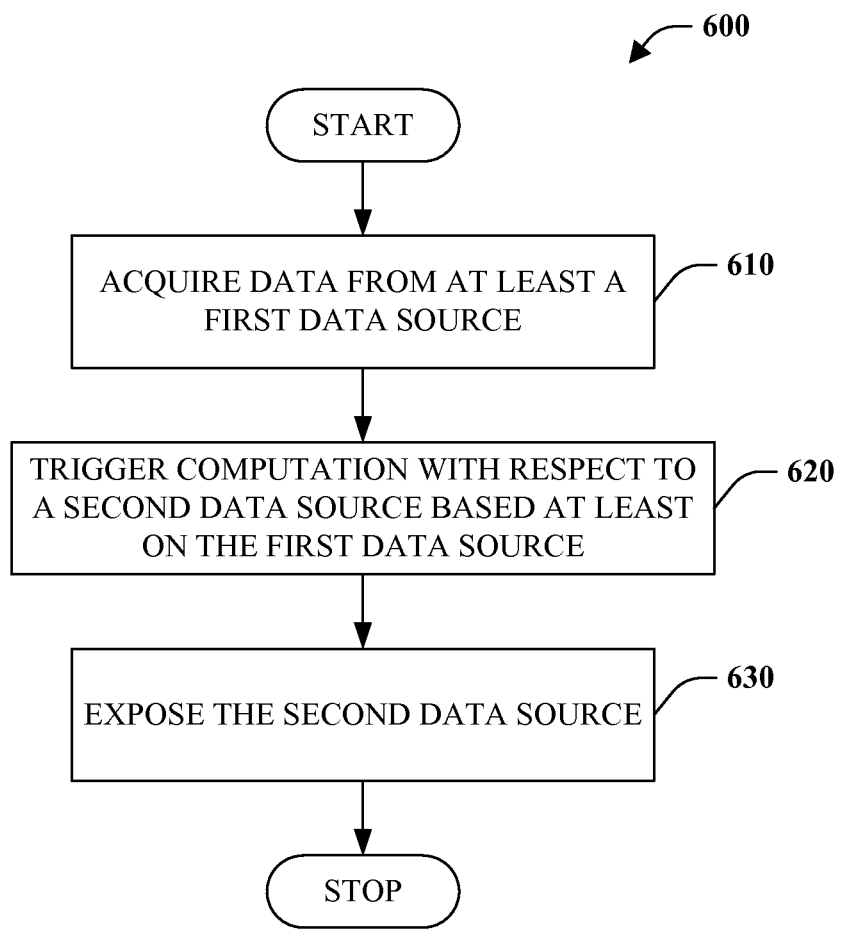
FIG. 6 is a flow chart diagram of a method of distributed processing.

Referring to FIG. 6, a method of distributed computation 600 is illustrated. At reference numeral 610, data from at least a first data source is acquired. For example, the first data source can correspond to a stream of data, wherein the acquired data corresponds to the latest, or most current, data such as the current temperature or latest stock price. At numeral 620, computation is triggered with respect to a second data source based at least on the first data source. In other words, the second data source can depend on the first data source and vary as a function of the at least one first data source. Furthermore, the computation can be performed synchronously as a transaction thereby preserving ACID properties. At reference numeral 630, the second data source is exposed, for example for use by other dependent data sources.

Figure 7:
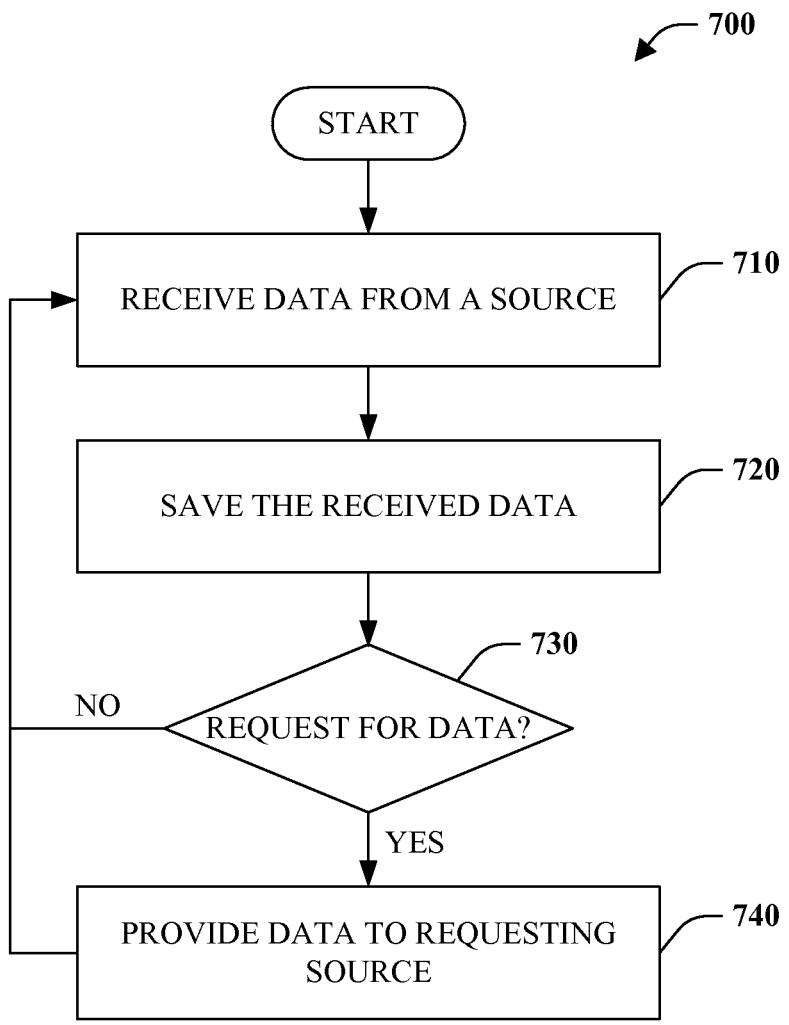
FIG. 7 is a flow chart diagram of method of facilitating exchange of data across data sources.

FIG. 7 illustrates a method 700 of facilitating exchange of data across data sources. At reference numeral 710, data is received, for example from a first data source. At 720, the received data is stored, for example in a queue. At reference 730, a determination is made as to whether there is a request for data, for example from a second data source. If there is not a current request for data at 730 ("NO"), the method 700 loops back to reference numeral 710 where it continues to receive and subsequently save data at 720. If, however, there is a request for data ("YES") data is provided to the requesting source at numeral 740 and the method loops back to reference numeral 710. In other words, data that is pushed from a first source is queued and subsequently pulled out of the queue by a second data source, namely the requesting source. In accordance with one embodiment, the request and act of providing data can be incremental such that a single value is provided for example from the front of a first-in-first-out (FIFO) queue.

Figure 8:
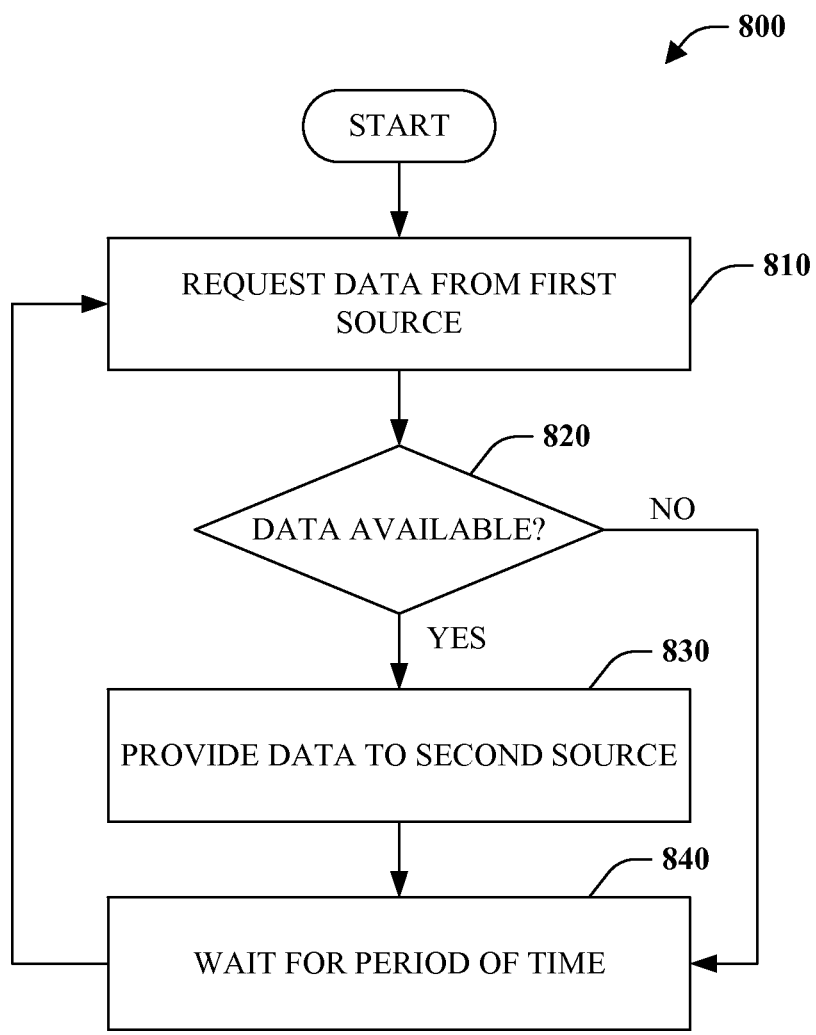
FIG. 8 is a flow chart diagram of a method of facilitating exchange of data across data sources.
Figure 9:
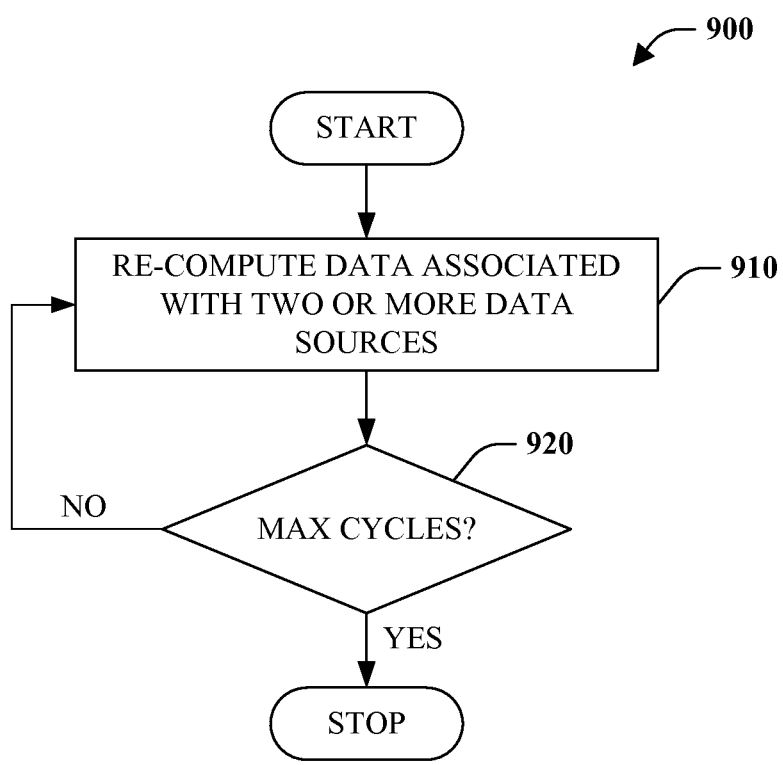
FIG. 9 is a flow chart diagram of a method of providing asynchrony and eventual consistency.

FIG. 8 depicts a flow chart diagram of a method 800 of facilitating exchange of data across data sources. At reference numeral 810, a data is requested from a first data source. At 820, a determination is made as to whether any data is available. For example, the determination can concern whether any new data is available from the last request. If the is no data available ("NO"), the method 800 continues at 840 where it waits for a period of time. However, if data is available ("YES"), the method 800 proceeds to reference numeral 830 where the available data is provided to a second source. In other words, the data is pulled from the first source at periodic intervals and pushed to the second source. After waiting for a period of time, at 840, the method 800 continues at reference numeral 810 where data is again requested from the first source.

FIG. 900 is a flow chart diagram of method of providing eventual consistency. At reference numeral 910, data associated with two or more data sources is re-computed, for example based on a change to a dependent data source. In some cases, where cycles exist, such re-computation can set in motion a non-terminating re-computation. For example, if "A" depends on "B" and "B" depends on "A," then a change to "A" will cause continuous re-computation since a change to "A" causes "B" to change which then causes "A" to change again. At reference numeral 920, a check is made as to whether a maximum number of cycles have occurred. If the maximum number of cycles has not been reached ("NO"), the method 900 can return to reference numeral 910. Alternatively, the method 900 can terminate upon reaching the maximum number of cycles ("YES"). In this manner, eventual consistency can be ensured artificially. Further, method 900 can be explicitly initiated to provide further updating and subsequent consistency.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner It is to be appreciated a myriad of additional or alternate examples of varying scope could have been presented, but have been omitted for purposes of brevity.

The term "coSQL" is intended to refer to a specific non-relational, key-value data model that is the mathematical dual of a relational or SQL data model. More specifically, "coSQL" corresponds to particular "NoSQL" data model that when the mathematical dual is applied thereto, the relational or SQL data model results.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
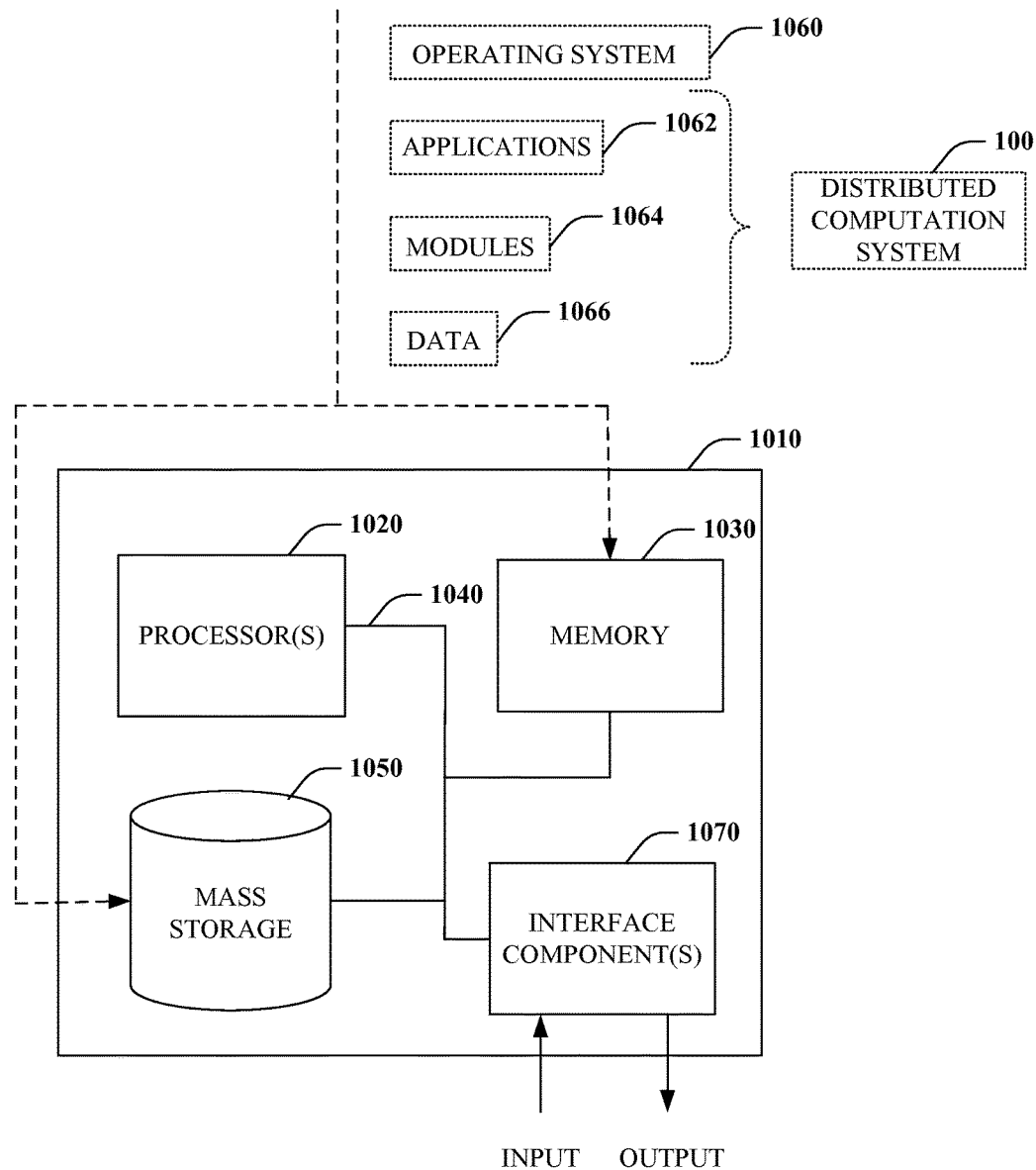
FIG. 10 is a schematic block diagram illustrating a suitable operating environment for aspects of the subject disclosure.

In order to provide a context for the claimed subject matter, FIG. 10 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 10, illustrated is an example general-purpose computer 1010 or computing device (e.g., desktop, laptop, server, hand-held, programmable consumer or industrial electronics, set-top box, game system . . . ). The computer 1010 includes one or more processor(s) 1020, memory 1030, system bus 1040, mass storage 1050, and one or more interface components 1070. The system bus 1040 communicatively couples at least the above system components. However, it is to be appreciated that in its simplest form the computer 1010 can include one or more processors 1020 coupled to memory 1030 that execute various computer executable actions, instructions, and or components stored in memory 1030.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration.

The computer 1010 can include or otherwise interact with a variety of computer-readable media to facilitate control of the computer 1010 to implement one or more aspects of the claimed subject matter. The computer-readable media can be any available media that can be accessed by the computer 1010 and includes volatile and nonvolatile media and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1010.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1030 and mass storage 1050 are examples of computer-readable storage media. Depending on the exact configuration and type of computing device, memory 1030 may be volatile (e.g., RAM), non-volatile (e.g., ROM, flash memory . . . ) or some combination of the two. By way of example, the basic input/output system (BIOS), including basic routines to transfer information between elements within the computer 1010, such as during start-up, can be stored in nonvolatile memory, while volatile memory can act as external cache memory to facilitate processing by the processor(s) 1020, among other things.

Mass storage 1050 includes removable/non-removable, volatile/non-volatile computer storage media for storage of large amounts of data relative to the memory 1030. For example, mass storage 1050 includes, but is not limited to, one or more devices such as a magnetic or optical disk drive, floppy disk drive, flash memory, solid-state drive, or memory stick.

Memory 1030 and mass storage 1050 can include, or have stored therein, operating system 1060, one or more applications 1062, one or more program modules 1064, and data 1066. The operating system 1060 acts to control and allocate resources of the computer 1010. Applications 1062 include one or both of system and application software and can exploit management of resources by the operating system 1060 through program modules 1064 and data 1066 stored in memory 1030 and/or mass storage 1050 to perform one or more actions. Accordingly, applications 1062 can turn a general-purpose computer 1010 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the distributed computation system 100 or portions thereof can be, or form part, of an application 1062, and include one or more modules 1064 and data 1066 stored in memory and/or mass storage 1050 whose functionality can be realized when executed by one or more processor(s) 1020.

In accordance with one particular embodiment, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the distributed computation system 100, and/or associated functionality can be embedded within hardware in a SOC architecture.

The computer 1010 also includes one or more interface components 1070 that are communicatively coupled to the system bus 1040 and facilitate interaction with the computer 1010. By way of example, the interface component 1070 can be a port (e.g., serial, parallel, PCMCIA, USB, FireWire . . . ) or an interface card (e.g., sound, video . . . ) or the like. In one example implementation, the interface component 1070 can be embodied as a user input/output interface to enable a user to enter commands and information into the computer 1010 through one or more input devices (e.g., pointing device such as a mouse, trackball, stylus, touch pad, keyboard, microphone, joystick, game pad, satellite dish, scanner, camera, other computer . . . ). In another example implementation, the interface component 1070 can be embodied as an output peripheral interface to supply output to displays (e.g., CRT, LCD, plasma . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of distributed computation, comprising:
    employing at least one processor configured to execute computer-executable instructions stored in memory to perform the following acts:
    receiving data supplied asynchronously from a second data source;
    detecting a change in the data compared to a prior value received from the second data source;
    triggering re-computation of a function that produces a result that represents a value of a first data source based on data from the second data source in response to detecting the change, wherein the first and second data source implement different data models and reside on different network-accessible computers coupled by the function, and the re-computation is performed independent of a spreadsheet; and
    revealing the result of function re-computation with respect to the first data source.

2. The method of claim 1 further comprising triggering computation of the data of the second data source as a function of data acquired from the first data source.

3. The method of claim 2 further comprising confining computation with respect to the first and second data sources to a predetermined number of cycles.

4. The method of claim 1 further comprising pulling data from the second data source and pushing the data to the first data source.

5. The method of claim 1 further comprising capturing data pushed by the second data source and enabling the data to be retrieved by the first data source.

6. The method of claim 1 further comprising triggering generation of a stream of values in the first data source, wherein the stream of values is an asynchronous sequence of values.

7. The method of claim 1 further comprising exposing the first data source to a third data source, wherein the first data source is embedded within the third data source.

8. A system of distributed computation, comprising:
    a processor coupled to a memory, the processor configured to execute computer-executable instructions stored in the memory that when executed perform a method, the method comprising:
    receiving a change to a second-data-source value supplied asynchronously;
    re-computing a function that produces a result that represents a first-data-source value based on a changed second-data-source value in response to the change, wherein the second data source and the first data source implement different data models and reside on different network-accessible computers, and the function defines dependency between values of the second data source and the first data source; and
    outputting the first-data source value, wherein the re-computing and the outputting are performed independent of a spreadsheet.

9. The system of claim 8, the method further comprises computing the first-data-source value synchronously and transactionally as a function of the changes.

10. The system of claim 8, the method further comprises exposing the first-data-source value to the second data source.

11. The system of claim 8, at least one of the first data source or the second data source is embedded within a third data source.

12. The system of claim 8, at least one of the first data source or the second data source is supported by a key-value data model.

13. The system of claim 12, the key-value data model is a mathematical dual of a relational data model.

14. The system of claim 8, at least one of the first data source or the second data source produces a push-based stream of data.

15. The system of claim 8, the method further comprises receiving a value from the second data source and providing the value to the first data source upon request.

16. The system of claim 8, the method further comprises retrieving a value from the second data source providing the value to the first data source.

17. A computer-readable storage medium having instructions stored thereon that enables at least one processor to perform the following acts:
    receiving a first stream, comprising an asynchronous sequence of data, from a first data source;
    detecting a change in the data of the first stream from a previously received value of the first stream from the first data source;

re-computing a second stream, by a processor, as a function of the change in a first stream from a first data source; and exposing the second stream to a second data source as input, wherein the acts are performed without a spreadsheet and the first data source and the second data source implement different data models.

18. The computer-readable storage medium of claim 17 further comprising providing data received from the first stream incrementally upon request.

19. The computer-readable storage medium of claim 17 further comprising retrieving data from the first stream at periodic intervals.

* * * * *